United States Patent
Lee

(10) Patent No.: US 7,458,682 B1
(45) Date of Patent: Dec. 2, 2008

(54) EYEGLASS WITH MULTIMEDIA FUNCTIONS OF MUSIC PLAYING AND REMOTE COMMUNICATION

(75) Inventor: Ming-Shuang Lee, Tainan (TW)

(73) Assignee: Double Hero Corporation, Tainan (TW)

( * ) Notice: Subject to any disclaimer, the term of this patent is extended or adjusted under 35 U.S.C. 154(b) by 0 days.

(21) Appl. No.: 11/896,881

(22) Filed: Sep. 6, 2007

(51) Int. Cl.
*G02C 1/00* (2006.01)

(52) U.S. Cl. ....................... 351/158; 381/381
(58) Field of Classification Search ................. 351/158, 351/41, 111, 121; 381/376, 371, 374, 381; 455/343, 344, 347, 350, 351
See application file for complete search history.

(56) References Cited

U.S. PATENT DOCUMENTS 6,301,367 B1 * 10/2001 Boyden et al. .............. 381/376
6,769,767 B2 * 8/2004 Swab et al. ................. 351/158
7,182,459 B1 * 2/2007 Chen .......................... 351/158
2007/0098203 A1 * 5/2007 Ingram ....................... 381/381

* cited by examiner

*Primary Examiner*—Hung X Dang
(74) *Attorney, Agent, or Firm*—Birch, Stewart, Kolasch & Birch, LLP

(57) ABSTRACT

An eyeglass with multimedia functions of music playing and remote communication is provided, which includes a frame assembly having two temple members, an earphone, a detachable communication and music module, and a temple tip cover. The detachable communication and music module can be attached to or detached from one of the temple members. A jack socket can be disposed on the detachable communication and music module for plugging in the earphone. The temple tip cover has a hanging portion and used for covering on one of the temple members, and the hanging portion is used for hanging the earphone when not use. Therefore, users can attach the detachable communication and music module to the frame assembly, such that the users can receive phone calls or enjoy music when wearing the eyeglass. Or, the users can detach the detachable communication and music module to reduce the weight of the frame assembly.

10 Claims, 5 Drawing Sheets

EYEGLASS WITH MULTIMEDIA FUNCTIONS OF MUSIC PLAYING AND REMOTE COMMUNICATION

BACKGROUND OF THE INVENTION

1. Field of Invention

The present invention relates to an eyeglass with multimedia functions of music playing and communication, especially to an eyeglass from which a multimedia module can selectively be attached or detached.

2. Related Art

Referring to FIG. 1, it is a conventional multi-functional eyeglass. The multi-functional eyeglass 100 includes a frame assembly 101. A music generator device 103 and a wireless communication device 104 are disposed on two temple members 102 of the frame assembly 101, respectively. The outer surface of each temple member is disposed with an earphone 105, and the two earphones 105 are fixedly configured and electrically coupled to the music generator device 103 and the wireless communication device 104, respectively. The positions of the earphones are aimed to the ear holes of user, so that the user can listen to the music played by the music generator device 103 or receive a phone call from the wireless communication device 104.

However, the conventional multi-functional eyeglass have some drawbacks, that is, when the user doesn't want to listen to music or receive phone calls, he/she can only switch off the music generator device 103 or the wireless communication device 104, but the weight of the whole frame assembly 101 does not change at all. If long-time use of the eyeglass, the user may easily feel tired or feel pain due to overtime wearing of the frame assembly 101. Besides, the earphones 105 are configured in a suspended manner, which is not only occupy space and but easily being damaged or broken by impacting of external force.

SUMMARY OF THE INVENTION

One aspect of the present invention is to provide an eyeglass with multimedia functions, so that a user can freely attach or detach a multimedia module disposed on the eyeglass; therefore, when the user wears the eyeglass with multimedia functions, the user can listen to music or receive phone calls at same time, if desired. Or, when the user doesn't want to use the multimedia module, he/she can easily detach the multimedia module from the frame assembly, so as to reduce the weight of the eyeglass.

The eyeglass with multimedia functions of music playing and remote communication comprises a frame assembly, an earphone, a detachable communication and music module, and a temple tip cover.

The frame assembly includes two temple members. One of the temple members has a buckle hole, and the detachable communication and music module is disposed with a music generator module and a remote communication module. The music generator module is used for playing music; however, the remote communication module is used for a remote communication (receiving phone calls). The detachable communication and music module further has a jack socket and a buckle member. The jack socket is used for plugging in an earphone, which make the earphone electrically couple to the music generator module and the remote communication module. The buckle member is used to buckle with the corresponding buckle hole in one of the temple members, so that the detachable communication and music module can be buckled with one side of the frame assembly.

The temple tip cover is used to cover on one of the temple members. The chosen temple member is usually the one buckled with the detachable communication and music module. In addition, the temple tip cover has a hanging portion, so that the earphone can be hung when not use.

In the eyeglass with multimedia functions, the detachable communication and music module further includes a memory module for storing at least one music information. Besides, the remote communication module is a Bluetooth module, an infrared ray communication module, or other wireless communication modules, and the earphone is a mono earphone 231 or a stereo earphone 232.

The present invention has better effects than that of prior art, that is, the user can attach the detachable communication and music module on the frame assembly, if desired. Therefore, when the user wears the eyeglass, he/she can listen to music or receive phone calls at same time. Also, when the earphone is not use, it can be hung by the hanging portion or plugged out from the jack socket and placed on other places, so that the earphone would not be suspended because of no accommodation for storing.

On the other hand, when the user does not want to use the detachable communication and music module, he/she can detach the detachable communication and music module from the frame assembly, so as to reduce the weight of the frame assembly. Therefore, the user would not suffer too much burden, or feel tired or feel pain in partial area when wearing the eyeglass in long hours.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

The features and practice of the present invention will be illustrated below in detail through preferred embodiments with reference to the accompanying drawings.

Figure 1:
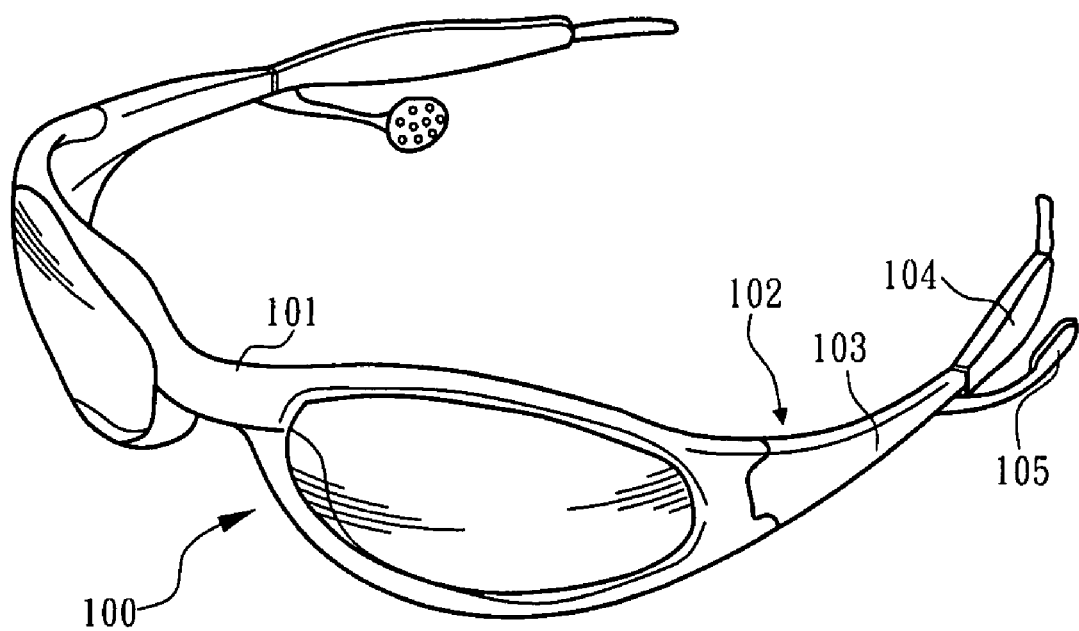
FIG. 1 is a schematic diagram of a conventional multi-functional eyeglass.
Figure 2A:
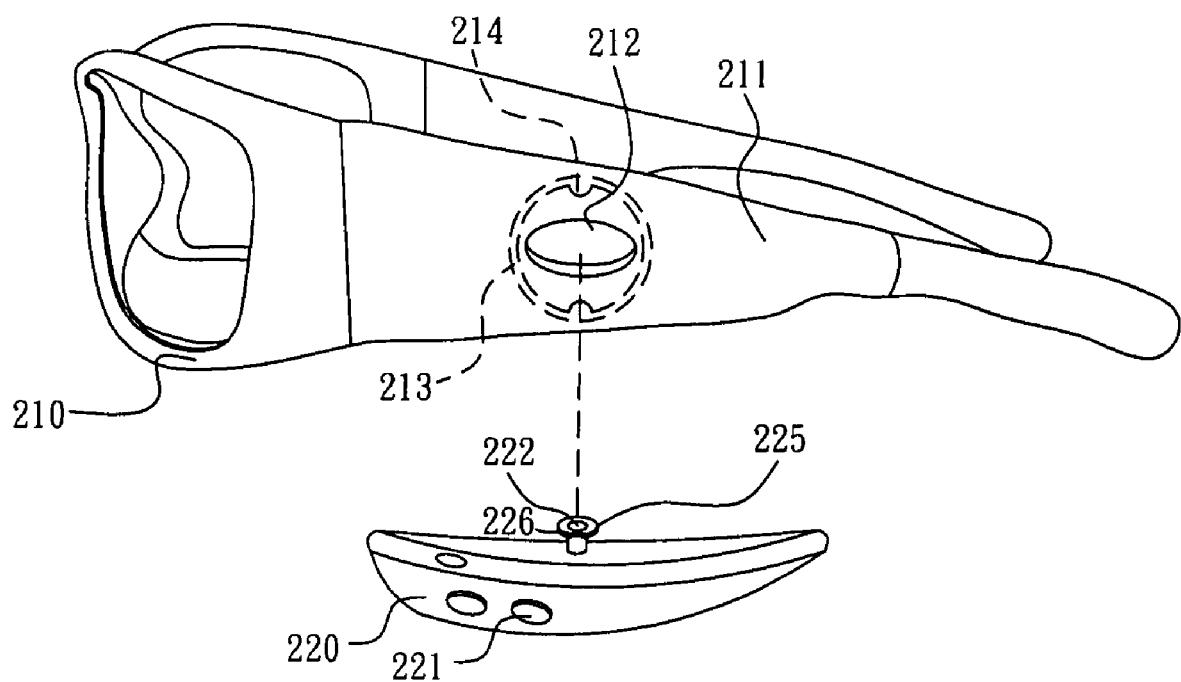
FIG. 2A is a structural schematic diagram of one embodiment of the present invention.
Figure 2B:
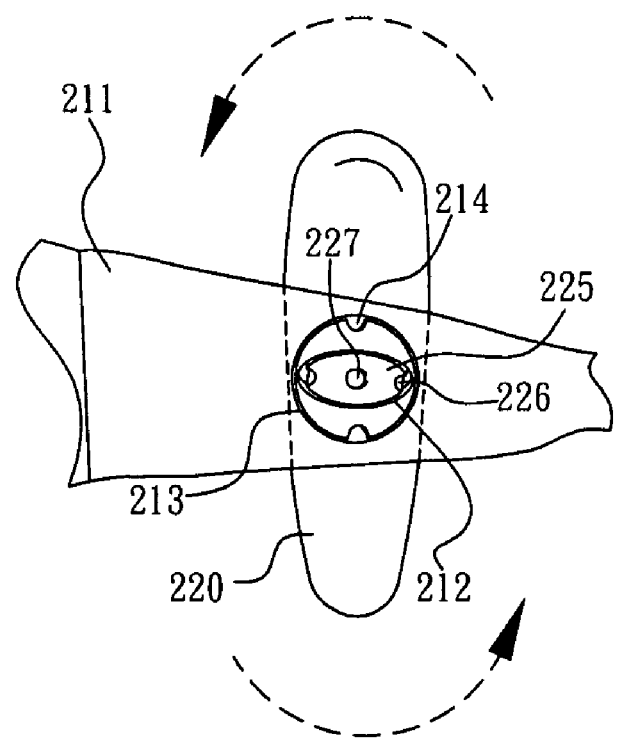
FIG. 2B is a schematic diagram of buckling of one embodiment of the present invention.
Figure 2C:
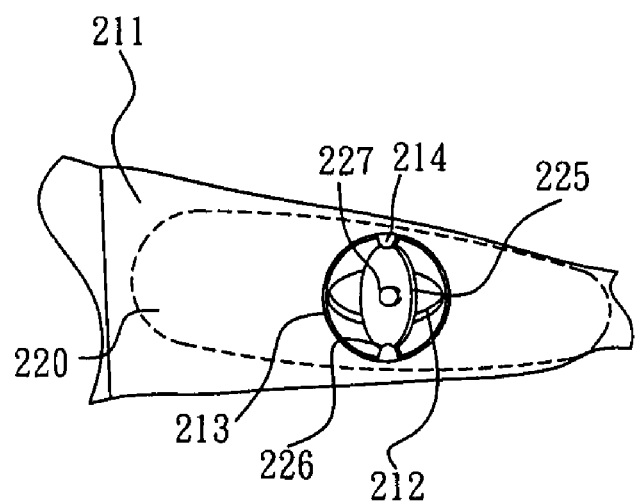
FIG. 2C is a schematic diagram of pivotally buckling of one embodiment of the present invention.

As shown in FIG. 2A to FIG. 2C, they are a structural schematic diagram, a schematic diagram of buckling, and a schematic diagram of pivotally buckling of one embodiment of the present invention. In the embodiment, the eyeglass with multimedia functions comprises a frame assembly 210 and a detachable communication and music module 220.

The frame assembly 210 has two temple members 211, and the two temple members 211 are used to hang on a user's two ears, such that the frame assembly 210 therefore can be hung on the head portion of the user. In addition, in the two temple members 211, one of the temple members 211 is disposed with a buckle hole 212. The detachable communication and music module 220 includes a memory module, a music generator module, and a remote communication module. The memory module is used for storing at least one music information, and the format of the music information is one of MPEG-1 Audio Layer 3(MP3), wave audio file format (WAV), and windows media audio (WMA). The music generator module is used for playing the music information stored in the memory module, and the remote communication module is used for receiving wireless signals to proceed a remote communication (receiving phone calls).

The outer surface of the detachable communication and music module 220 is disposed with at least a press key 221 and at least one microphone 222. The press key is used for operating music playing and remote communication by the user. However, the microphone 222 is used for receiving voice signals when the user conducts a remote communications session, and wireless transmitting the voice signals through the remote communication module.

In one embodiment, the Bluetooth is taken as an example as the remote communication module. The basic requirement of the Bluetooth includes a power unit, a Bluetooth receiving-transmitting unit, a control unit, and a central process unit. Wherein, the power unit is used for supplying the operation required electric power of the Bluetooth, the Bluetooth receiving-transmitting unit is used for receiving and transmitting Bluetooth signals, the control unit is used for transmitting a control signal, and the central process unit is used for coding and decoding the Bluetooth signals. In addition, when the music generator module is playing music and the Bluetooth receiving-transmitting unit receives a Bluetooth signal at the same time, the central process unit may decode the Bluetooth signal. If confirming that the signal is an incoming phone call signal, the central process unit activates the control unit to send a control signal to the music generator module to stop music playing. Meanwhile, the Bluetooth receiving-transmitting unit sends a prompt signal to alert the user to answer the phone call.

The outer surface of the detachable communication and music module 220 is further disposed with a buckle member. The buckle member can be buckled with the buckle hole, such that the detachable communication and music module 220 and the temple members 211 of the frame assembly 210 can be tightly buckled together.

The buckle hole 212 is of oval shaped configuration, and disposed on the inner side of the temple member 211. In addition, a round rotation groove 213 is further provided around the cycle of the buckle hole 212. The rotation groove 213 is configured with a pair of anchor bumps 214, and the corresponding axis direction of the anchor bumps 214 is perpendicular to the axis direction of the temple member 211. The buckle member of the embodiment is a rotatable lug member 225, which is used for explanation. The shape of the rotatable lug member 225 is identical to that of the buckle hole 212, and the sizes of the rotatable lug member 225 and the buckle hole 212 are also approximately the same. Besides, both ends of the rotatable lug member 225 have an anchor pit 226, respectively.

When buckled with the buckle hole 212, the rotatable lug member 225 is pivotally rotated with a specific angle, and the rotation angle is in the range of −90° to +90°. Therefore, the rotatable lug member 225 is rotated tightly against inside the rotation groove 213, the anchor pits 226 and the anchor bumps 214 are engaged with each other, and the detachable communication and music module 220 is tightly attached to the outer side surface of the temple member 211, so as to form three different attaching effect and engaging effect. Hence, by the attaching effect and engaging effect, the rotatable lug member 225, the temple member 211, and the detachable communication and music module 220 are tightly configured, such that the detachable communication and music module 220 can be tightly engaged to the temple member 211 and connected with the frame assembly 210 by means of buckling.

In addition, the microphone 222 of the detachable communication and music module 220 can be disposed in the rotatable lug member 225, and a sound receiving hole 227 is opened in the rotatable lug member 225, so that the microphone 222 can directly receive voice from the user without the need to connect with an extra sound-receiving device, so as to save configuration space.

On the other hand, if the user wants to detach the detachable communication and music module 220, the rotatable lug member 225 as an axle center is turned to pivotally rotate with an angle of positive (or negative) 90°; therefore, the rotatable lug member 225 can be released from the buckle hole 212, such that the detachable communication and music module 220 and the temple member 211 are separated with each other, in other words, the connecting state of the detachable communication and music module 220 and the temple member 211 is dismissed.

Figure 3A:
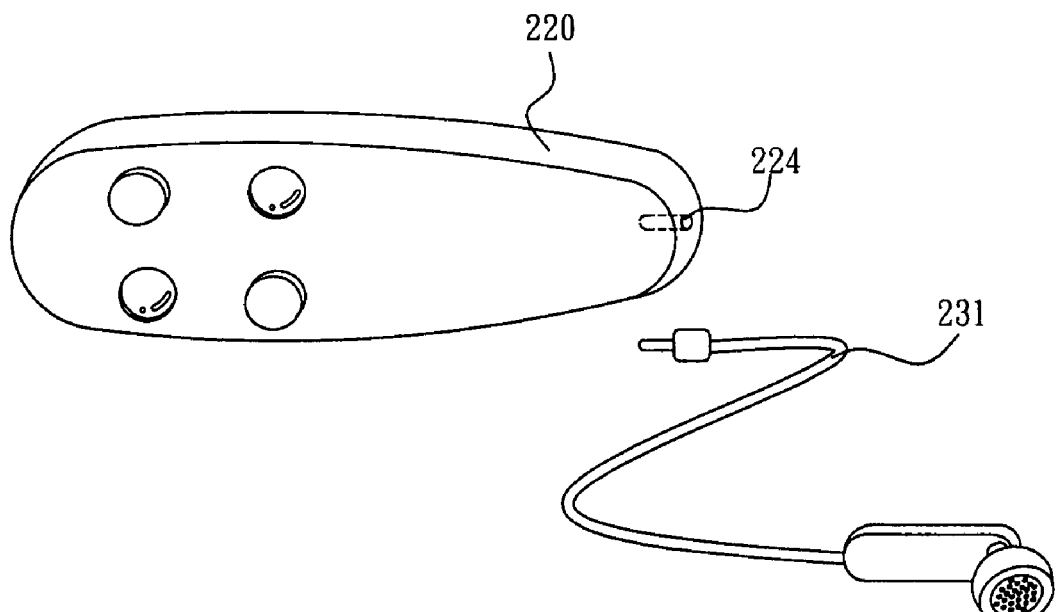
FIG. 3A is a schematic diagram of plugging in a mono earphone of one embodiment of the present invention.
Figure 3B:
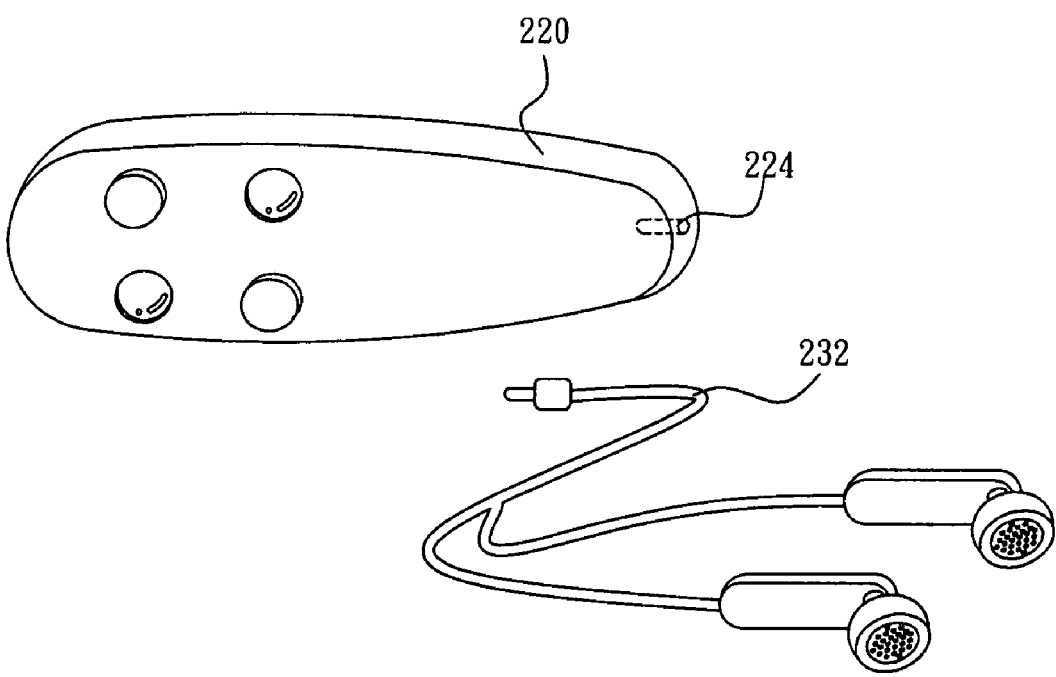
FIG. 3B is a schematic diagram of plugging in a stereo earphone of one embodiment of the present invention.

As shown in FIGS. 3A and 3B, they are schematic diagrams of plugging in an earphone of one embodiment. The outer surface of the detachable communication and music module 220 further is disposed with a jack socket 224 provided for plugging in an earphone, such that the earphone can electrically couple to the music generator module and the remote communication module via the jack socket to listen to music played by the music generator module and receive phone calls from the remote communication module.

Figure 4:
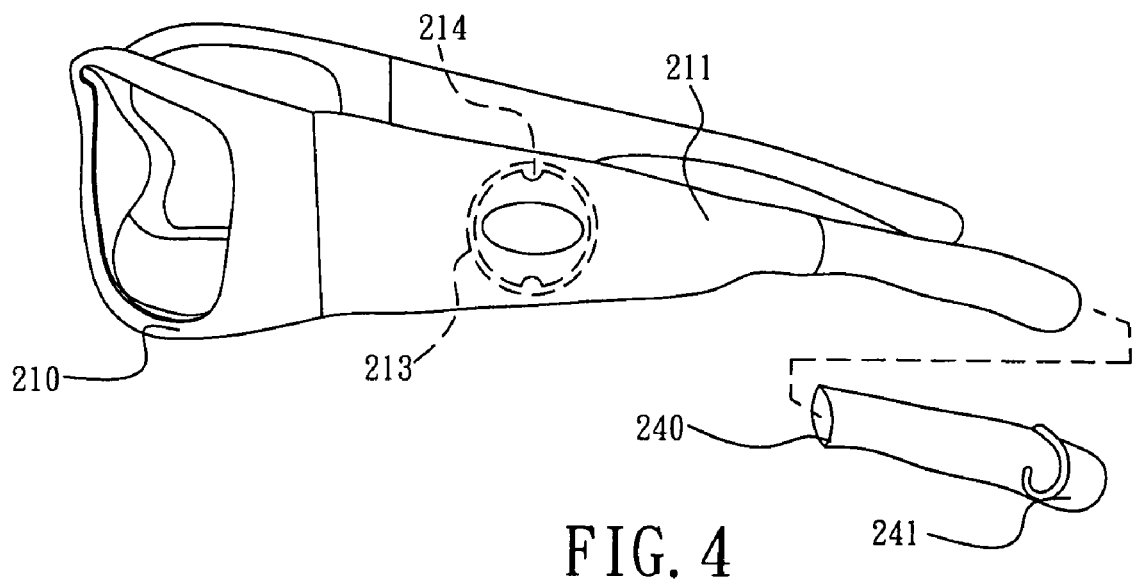
FIG. 4 is a schematic diagram of a temple tip cover to cover on the temple member of one embodiment of the present invention.

As shown in FIG. 4, it is a schematic diagram of a temple tip cover to cover on the temple member of the present invention. The eyeglass with multimedia functions of the present invention further comprises the temple tip cover 240. The temple tip cover 240 has a hanging portion 241 and is used to cover on one of the temple members 211 of the frame assembly 210. The shape of the hanging portion 241 is of hook-shaped configuration. In the situations that when the user does not want to listen to music or receive phone calls, but also the user is not want to detach the detachable communication and music module 220, and there is no accommodation space to accommodate the earphone, the user may mount the earphone on the hanging portion 241, so that the earphone would not be suspended to affect the user for doing other tasks.

However, when the detachable communication and music module 220 is detached, in order to avoid the hanging portion 241 of the temple tip cover 240 being too queer, the temple tip cover 240 can be taken off or be replaced with ordinary temple tip cover.

From above descriptions, the user disposes the detachable communication and music module 220 on the temple member 211 according to their demands, such that the users can wear the eyeglass and listen to music or receive phone calls at same time. When the detachable communication and music module 220 is not used, it can be detach from the temple member 211 to reduce the weight of the frame assembly 210 and temple member 211. Furthermore, when the earphone is not used, it can be hung on the hanging portion 241 or plugged out from the jack socket 224 to accommodate to other places, so that the earphone wouldn't be damaged or broken by impacting of external force. Besides, the microphone 222 can be configured in the detachable communication and music module 220 without the need to connect with an extra sound-receiving device, therefore, it can achieve the multi-purposes of safety, convenience, only a little space occupied in one device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An eyeglass with multimedia functions of music playing and remote communication, comprising:
   a frame assembly, having two temple members and a buckle hole disposed on one of the temple members, a rotation groove being provided around cycle of the buckle hole and a pair of first positioning elements being disposed on the rotation groove;
   a detachable communication and music module, including a music generator module and a remote communication module, and a jack socket being provided on the detachable communication and music module for plugging in the earphone, the detachable communication and music module having a buckle member, and the buckle member being buckled with the buckle hole for connecting the detachable communication and music module with the frame assembly, wherein both ends of the rotatable lug member have an second positioning element respectively; and
   a temple tip cover, used to cover on one of the temple members, and the temple tip cover having a hanging portion for hanging an earphone,
   wherein shape of the buckle member is identical to that of the buckle hole, and when the buckle member being buckled with the buckle hole and rotated in a specific angle, the buckle member is rotated and engaged to the temple member, and the first positioning element and the second positioning element are engaged with each other, such that the detachable communication and music module is tightly attached to a side surface of the temple member.

2. The eyeglass with multimedia functions of music playing and remote communication as claimed in claim 1, wherein shape of the buckle hole is of oval shaped configuration, and the buckle member is a rotatable lug member, the first positioning element is an anchor bump and the second positioning element is an anchor pit.

3. The eyeglass with multimedia functions of music playing and remote communication as claimed in claim 1, wherein the earphone is a mono earphone or a stereo earphone.

4. The eyeglass with multimedia functions of music playing and remote communication as claimed in claim 1, wherein the detachable communication and music module further includes a memory unit, and the memory unit stores at least one music information.

5. The eyeglass with multimedia functions of music playing and remote communication as claimed in claim 1, wherein the remote communication module is selected from a group consisting of a Bluetooth module, an infrared ray communication module, and other wireless communication modules.

6. The eyeglass with multimedia functions of music playing and remote communication as claimed in claim 1, wherein the specific angle is −90° rotation angle or 90° rotation angle.

7. The eyeglass with multimedia functions of music playing and remote communication as claimed in claim 1, wherein the detachable communication and music module comprises a microphone disposed in the buckle member.

8. An eyeglass with multimedia functions of music playing and remote communication, comprising:
   a frame assembly, having two temple members and a buckle hole disposed on one of the temple members, a rotation groove being provided around cycle of the buckle hole and a pair of anchor bumps being disposed on the rotation groove;
   a detachable communication and music module, including a music generator module, a remote communication module, a memory unit for storing music information, and a jack socket being provided on the detachable communication and music module for plugging in the earphone, the detachable communication and music module having a rotatable lug member, and the rotatable lug member being buckled with the buckle hole for connecting the detachable communication and music module with the frame assembly, wherein both ends of the rotatable lug member have an anchor pit respectively; and
   a temple tip cover, used to cover on one of the temple members, and the temple tip cover having a hanging portion for hanging an earphone,
   wherein the rotatable lug member and the buckle hole are of oval shaped configuration, and when the rotatable lug member being buckled with the buckle hole and rotated in a specific angle, the rotatable lug member is rotated and engaged to the temple member, and the anchor bump and the anchor pit are engaged with each other, such that the detachable communication and music module is tightly attached to a side surface of the temple member.

9. The eyeglass with multimedia functions of music playing and remote communication as claimed in claim 8, wherein the specific angle is −90° rotation angle or 90° rotation angle.

10. The eyeglass with multimedia functions of music playing and remote communication as claimed in claim 8, wherein the detachable communication and music module comprises a microphone disposed in the rotatable lug member.

* * * * *